United States Patent
Giuffre'

(10) Patent No.: US 6,896,758 B1
(45) Date of Patent: May 24, 2005

(54) METHOD AND PLANT FOR FABRICATING DRIP IRRIGATION PIPES

(76) Inventor: Carmelo Giuffre', Via Crispi, 7, Capo d'Orlando (IT) I-98071

( * ) Notice: Subject to any disclaimer, the term of this patent is extended or adjusted under 35 U.S.C. 154(b) by 0 days.

(21) Appl. No.: 09/763,173

(22) PCT Filed: Aug. 9, 1999

(86) PCT No.: PCT/EP99/05751

§ 371 (c)(1),
(2), (4) Date: Apr. 30, 2001

(87) PCT Pub. No.: WO00/10378

PCT Pub. Date: Mar. 2, 2000

(30) Foreign Application Priority Data

Aug. 20, 1998 (IT) ............................ SV98A0047

(51) Int. Cl.[7] ............................................. B29C 47/02

(52) U.S. Cl. ...................... 156/244.13; 156/244.19; 156/244.27; 156/500

(58) Field of Search ................. 156/244.13, 244.19, 156/244.27, 500, 513, 539, 543, 552; 138/42

(56) References Cited

U.S. PATENT DOCUMENTS

| 5,271,786 | A | 12/1993 | Gorney et al. | |
|---|---|---|---|---|
| 5,324,371 | A | 6/1994 | Mehoudar | |
| 6,179,949 | B1 * | 1/2001 | Buluschek | 156/244.13 |
| 6,280,554 | B1 * | 8/2001 | Lambert et al. | 156/244.12 |
| 6,461,468 | B1 * | 10/2002 | Cohen | 156/244.13 |

FOREIGN PATENT DOCUMENTS

| EP | 0344605 | 12/1989 |
|---|---|---|
| EP | 0872172 | 10/1998 |
| WO | WO92/05689 | 4/1992 |

* cited by examiner

Primary Examiner—Blaine Copenheaver
Assistant Examiner—Barbara J. Musser
(74) Attorney, Agent, or Firm—James Creighton Wray; Meera P. Narasimhan (57) ABSTRACT

The invention relates to a method for fabricating a drip irrigation pipe, comprising a pipe (5) wherein a plurality of dripping elements (4) are bound, communicating with the outside through holes formed in the pipe wall. The method according to the invention provides that the pipe (5) is extruded and the individual dripping elements (4) are bound therein by consecutively feeding the dripping elements (4) inside the pipe through the extruding head (1). The speed of the dripping elements (4) is higher than that of the pipe upon extrusion at least in the area of first contact between the pipe and the dripping elements (4). The invention also relates to a plant for implementing said method.

34 Claims, 5 Drawing Sheets

METHOD AND PLANT FOR FABRICATING DRIP IRRIGATION PIPES

BACKGROUND OF THE INVENTION

The invention relates to a method for fabricating drip irrigation pipes, or similar, comprising the following steps:
a) Extruding a plastic pipe through an extruding head;
b) Progressively reducing the pipe, from the diameter coming out of the extruding head to a final diameter which provides the extruded pipe with a conical shape for a certain initial length.
c) Inserting a plurality of dripping elements consecutively and keeping pace with the advance of the extruded pipe, through the extruding head and into the extruded pipe;
d) Advancing each dripping element to an area of the pipe, whereat each dripping element is brought to contact with a predetermined area of the inner surface of the pipe, while having a predetermined speed relative to the speed of the pipe when contact occurs;
e) Cooling the pipe with the dripping elements;
f) Perforating the pipe where the dripping elements are provided.

Some methods for fabricating drip irrigation pipes of the type described above are known from the state of the art.

All these methods aim at binding the dripping elements with a predetermined resistance, in order to prevent the detachment of the dripping elements. To this end, substantially two methods have been developed. A first method provides that the dripping elements are deviated towards the pipe wall in the conical area, directly on exit from the extruding head and that, when the pipe and the emitting element are coupled, i.e. come to contact, the latter has a different speed, i.e. lower than that of the pipe. Further, downstream from the contact area, generally in a so-called subsequent calibrator, or even in the contact area itself, there are provided means for compressing the dripping elements against the pipe. Obviously, once the contact has occurred, the speeds of the pipe and of the dripping elements are the same.

This method is disclosed for example in document U.S. Pat. No. 5,271,786. In this method, the dripper units are displaced on a guide which is provided coaxially inside the extruded conduit. The contact between the dripper unit and the internal surface of the conduit takes place in the region of a first step of reduction of the cross-section of the extruded conduit. In this document the dripper unit is displaced transversally in the direction of the conduit by means of a guide section which is inclined in a direction converging against the conduit wall. At the location of contact of the dripper unit with the conduit, the conduit wall being reduced to a lower diameter has a substantially conical orientation and converges against the inner guide for the dripper unit. In this situation the leading end of the dripper unit is raised against the conically reducing wall of the extruded conduit and hurts it with a leading corner. This may lead to damage of the softened wall of the conduit.

A second method provides that the dripping elements are brought to contact with the pipe in an area in which the diameter of the latter has been reduced, that is downstream from the conical narrowed length. In this case, the emitting elements are advanced, at least in the area or location whereat they contact the pipe, at a speed which is substantially identical to that of the pipe itself. Once again, the contact is followed by a compression step. This method is disclosed in documents EP 344 605 and EP 872 172.

In both this documents, the orientation of the contact surfaces of the extruded conduit and of the dripper unit are convergent and such that the first contact takes place between the region of the corner of the leading head of the dripper and the inner surface of the extruded conduit.

In the first method, in order that the dripping elements are well fastened to the pipe, either long compression areas or considerable compression forces have to be provided. However, these dimensioning provisions are subject to substantial restrictions, due to the fact that the pipe must not be prevented from axially sliding, so that the correct formation of the pipe is not jeopardized. On the other hand, the second method requires a sufficiently accurate adjustment of the feed speed of the pipe and of the emitting elements, in order to ensure that the speeds of these two parts upon contact therebetween are substantially the same. Also in this case, the path along which the pipe and the dripping elements are submitted to mutual compression must be sufficiently long, or the compression force must be sufficiently high, therefore involving the risk that the advance of the extruded pipe is obstructed or hindered.

In all the disclosed methods and devices, care is taken to the fact that at the moment of the contact between extruded conduit and dripper unit both have either the same speed or the dripper unit is at rest or has a lower speed than the conduit.

Furthermore after the first contact, the dripper unit is not any more pushed or drawn by dedicated means, but is dragged by the extruded conduit itself.

Both the above measures are intended to avoid the damaging of the conduit during the contact between dripper units and conduit and during welding of the dripper units to the conduit.

SUMMARY OF THE INVENTION

The invention has the object to provide a method for fabricating trickle irrigation pipes of the type described hereinbefore, allowing to obviate the drawbacks of the well-known methods, while simplifying or anyway exploiting as well as possible the conditions occurring in the initial zone downstream from the extruder.

The invention achieves the above objects by providing a method as described hereinbefore, in which at least immediately before the contact between the pipe and each dripping element occurs, the dripping element has a higher speed than the pipe.

Preferably the dripper units have an higher speed than the pipe also at the moment of contact the one against the other.

According to a preferred embodiment, the dripper units are dragged or pushed or displaced further also after being come into contact against the pipe and independently of the pipe itself.

The speed of the dripper units immediately before or at the moment of the contact against the pipe may be higher than the pipe speed by an amount of 5% to 300%, preferably 10% to 150%, particularly 20% to 100%.

Thanks to this provision, a certain amount of the kinetic energy applied to the emitting elements is transferred into a compression impulse of the emitters against the inner surface of the pipe. The inertial motion of the dripping elements causes them to hit the inner surface of the pipe with a certain force. The transverse component of the force may be more or less considerable, from a minimum value in which there is a sort of tangential force generating a sort of impact mark impressed by the dripping elements in the contact area, also due to the relatively softened condition of the pipe, to a higher value, in which, in addition to the substantially tangential impact mark, there is also an axial impact compression force, exerted by the dripping element against the surface of the pipe.

The above substantially depends on the extension of the area of contact between the emitting elements and the pipe and/or on the orientation thereof.

The orientation of the dripping elements relative to the pipe, i.e. of the mutual contact surfaces is determined by the length of the pipe whereat the pipe comes to contact with the dripping elements, and by the orientation imparted to them by the feed path inside the pipe.

Obviously, the individual dripping elements, having a higher speed than the pipe, must be fed while keeping pace with the advance of the extruded pipe, in such a way that the individual dripping elements are provided at the predetermined distance from each other on the finished pipe.

In this case, a continuous feed is possible, the individual dripping elements being spaced, along the feed path, to an extent corresponding to the area of contact with the pipe, i.e. the dripping elements being consecutively and continuously fed, the distance between immediately successive elements being greater than the final distance separating them when they are applied to the pipe, all this being in relation with the speed differences between the dripping elements and the extruded pipe.

Alternatively, the individual dripping elements may be fed in a reciprocating and stick-slip motion, for example by pushers operated in a reciprocating motion.

A first variant of this feeding method may provide a start station wherein the dripping elements are kept still or moved at a speed which is not higher than that of the pipe and wherefrom they are accelerated one at a time and each separately at the higher speed until the impact with the extruded pipe occurs.

In a variant embodiment, along the feed path inside the pipe and up to an external station, there is provided a continuous line of dripping elements in mutual contact at the end sides. In this case, at the rear side, with respect to the advance direction of the pipe, there are provided means for the reciprocating acceleration of the last forwardmost dripping element of the line, which operate on the first rearmost dripping element of the line.

In a preferred embodiment, the contact between the dripping elements and the inner surface of the pipe occurs in the conical narrowed length of the pipe. In these conditions, the kinetic energy of the dripping elements changes, at least partially, into a compression force perpendicular to the inner surface of the pipe. The axial component is not detrimental, since it helps to cause a certain wedging action of the dripping element in the material which forms the pipe wall.

Thanks to this arrangement, a higher impact force is generated, and a stronger link between the two parts is obtained. Moreover, the adjustment of the two speeds is not critical, the ratio between the speeds of the pipe and of the emitters not being critical and not requiring strict tolerances.

According to a further improvement of the method, in the contact area, the two surfaces, the inner surface of the pipe and the facing surface of the dripping elements are preferably, oriented in such a way as to converge forming a predetermined angle which is very small.

The angle between the two surfaces of contact of the dripper unit and of the pipe is of such entity that the surface of the dripper unit is slightly inclined with respect to an orientation which in substantially parallel to the associate surface of the pipe.

Thanks to this feature the dripper unit contacts the pipe wall in an very smooth way having a converging path but having at the same time a reduced angle of incidence and quite the same orientation as the conical reduction section of the pipe entering the calibrator section.

In a device according to the invention this feature is achieved by providing an end section of the dripper guide which extends itself in the region of the conical reduction in cross section of the pipe between extruder exit mouth and calibrator unit entrance and which end section is slightly inclined in the same way as the conical section of the pipe but with a smaller angle with respect of the axis of the pipe.

This features allows also to provide independent means for pushing, dragging or in any way further exerting a displacement force on the dripper unit after having contacted the pipe without the risks of damaging the pipe and giving the opportunity of exerting a compression force of the dripper against the wall of the pipe after the first contact.

Advantages may be also obtained from providing, once the contact between the dripping elements and the pipe has occurred, a length of the path along which a mutual compression force is exerted by the dripping elements and by the pipe.

To this end, the dripping elements move, integrally with the pipe, on an internal abutment guide, whereas outside the pipe, in a position opposite to the abutment guide, there is provided a presser member.

According to a further characteristic, the advancing and/or dragging and/or pushing action of the dripping elements inside the pipe continues even when the impact or contact thereof with the pipe has occurred, in the succeeding mutual compression area.

Advantageously, the advancing and/or dragging and/or pushing action of the dripping elements is exerted in such a way that the advancing force exerted on the dripping elements and therefore on the pipe is limited to a certain predetermined value, either in a sudden or in a progressive way.

According to the type of means for conveying, advancing, dragging, or pushing the dripping elements, the force for advancing them may be limited by a friction effect occurring between said means and the dripping elements or by elastic damping means.

Advantageously, the orientation of the dripping elements and of the pipe in the compression length is such that the two parts are parallel to each other, at least with respect to the contact surfaces.

Particularly, the compression length is provided in a further conical narrowed length of the pipe downstream from the area of contact between the dripping elements and the pipe.

The compressing means and/or the abutment means, may be stationary, i.e. having surfaces of contact with the pipe and/or with the dripping elements, which, are stationary with respect to the advance of said parts or having surfaces which are movable together with the pipe and/or with the dripping elements, or, said means may be such that at least one of these means, or even both of them are driven by their own motion, dragging the pipe, together with the dripping elements, in the feed direction.

The dragging speed may be calibrated according to the best possible advance of the pipe.

This characteristic allows to adjust the advance speed of the pipe and keep it at optimum values, even in case of possible variations, due to compression forces exerted between the dripping element and the pipe.

In all three cases described above, the distance between the compression means outside the pipe and the means for abutment and/or guide of the dripping elements may be slightly smaller than the total thickness of the pipe wall and of the dripping elements.

The abutment means may advantageously consist of means for guiding the dripping elements and/or may even be the conveying, feeding and/or pushing means.

The invention also relates to a plant for implementing the method described hereinbefore, which plant comprises:

a) Means for extruding a plastic pipe, through an extruding head;

b) Calibrating means for progressively reducing the pipe from the diameter coming out of the extruding head to a final diameter along which reduction, the extruded pipe has a conical length.

c) Feeding means for inserting consecutively a plurality of dripping elements, and keeping pace with the advance of the extruded pipe, through the extruding head and into the extruded pipe;

d) Conveying and/or pushing and/or dragging means for feeding each dripping element to the conical narrowed area of the pipe whereat each dripping element is brought to contact with a predetermined area of the inner surface of the pipe, while having a predetermined speed with respect to the speed of the pipe when contact occurs;

e) Compressing means extending for a certain feed length and meant to mutually compares the pipe and the dripping elements for completely binding the dripping element to the pipe.

According to the invention, the conveying and/or pushing and/or dragging means are operated in such a way that the individual dripping elements are accelerated inside the pipe at a speed which is higher than that of the pipe, in the area and at the moment in which the impact of the dripping elements against the pipe occurs.

The invention relates to further characteristics, which will appear more clearly form the following description of a few non limiting application examples, shown in the accompanying drawings, in which:

DETAILED DESCRIPTION

Referring to the figures, it has to be pointed out that any characteristics appearing together in each of them may be individually combined to each other in order to obtain further obvious and possible combinations, not shown in the figures.

A plant for fabricating trickle irrigation pipes by extrusion, such as that described in state of the art patents EP 0 344 605 and/or U.S. Pat. No. 5,271,786, comprises an extruding head 1, having an annular chamber 101 and a radial conduct 201 for feeding plastic at the machinable state. The annular chamber 101 axially extends to an annular drawing conduct 301, whereof a continuous pipe comes out. In a coaxial position with respect to the annular conduct 301 and to the annular chamber 101, the extruding head 1 has a central through hole 2, wherein means 3 are supported for guiding a succession of plastic dripping elements 4. The guide means 3 extend from an end whereat the dripping elements 4 are charged, which is outside the extruding head 1, opposite to the annular drawing aperture of the pipe 5, and continue beyond the extruding head at the output of said pipe 5, to an area in which the pipe passes through a calibrating reduction, from the diameter coming out of the drawing hole, to the substantially final diameter. In this reduction area, the pipe 5 has a conical profile. After a short free length, the pipe passes through a first wall 6, determining the first diameter reduction, and anyway acting as a container for cooling water. At a certain distance from this wall, in the advance direction of the pipe 5, there is provided a so-called calibrator 7, having an aperture for the passage of the pipe, which has a diameter for narrowing the pipe to the substantially final diameter or to a further intermediate diameter, a further calibrator being provided, in this case, downstream from said first one 7. As pointed out above, through all these passages, the pipe has a substantially constant or continuous conical profile, but not necessarily a constant aperture angle. The guide means 3 extend to the area intervening between said first wall 6 and the succeeding calibrator 7. Obviously, this is not to be intended in a restricted sense, since the guide means 3 may also extend further to the area intervening between the calibrator 7 and a further second calibrator.

The slide plane 103 for the guide means 3 is in such a position, with respect to the facing inner surface of the pipe 5, that said slide plane 103 converges with the conical inner surface of the pipe 5, forming a predetermined angle therewith, and causing, in a certain location, the contact between the dripping element 4, fed along said guide plane, and the pipe 5. The contact area in the pipe may be located anywhere, and in the examples as shown in the figures, it is situated preferably, but not limited to, downstream from the first wall 6 for containing the cooling water, i.e. after the first conical free length of the pipe 5. However, the contact may also occur upstream from the wall 6, i.e. in said conical free length, or even in the area of the calibrator 7, or downstream therefrom, between said calibrator 7 and a further possible calibrator (not shown).

Referring to the figures, the dripping elements 4 may be dragged, pushed, or advanced with the help of any type of means. The slide plane may be a simple guide surface, along which the dripping elements 4 slide thanks to an appropriate low-friction arrangement. Alternatively, the means for advancing the dripping elements 4 may consist of the guides 3, which are of the operating type, i.e. being able to convey or provided or made in the form of conveying means.

Figure 3:
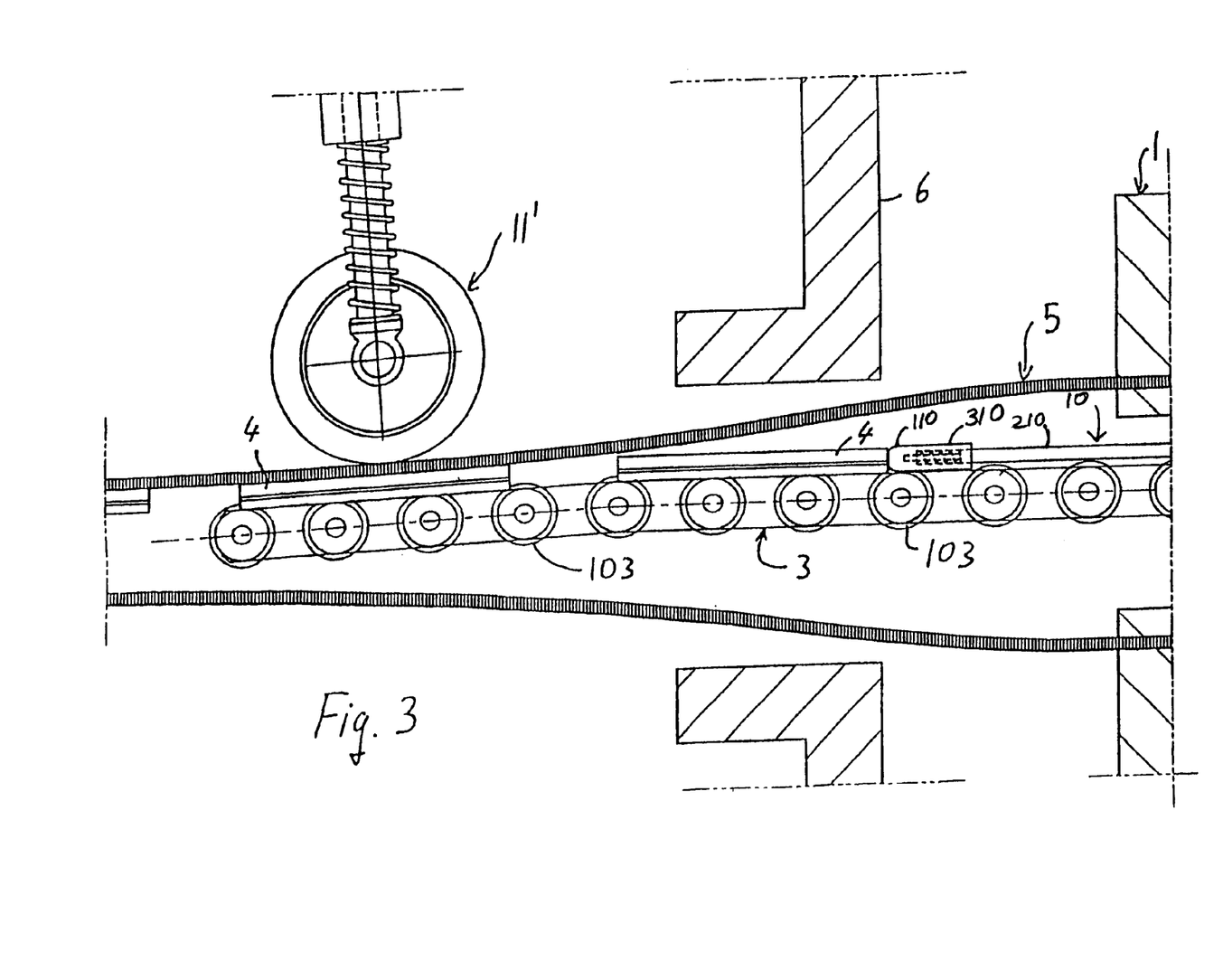
FIG. 3 is a view like that of FIG. 2, further enlarged and showing a further variant embodiment.

With particular reference to the figures, in the embodiment as shown therein, the guide means 3 are provided in the form of a roller way. The rollers may be rotatably driven, in such a way as to feed the dripping elements 4 or, as shown in FIG. 3, they may be idle, whereas pusher means are provided, for example a push-bar-10, which is driven by an axial reciprocating motion and consecutively pushes each dripping element 4 inside the pipe up to the area of contact therewith.

Obviously, many other solutions may be provided for feeding, dragging or advancing the dripping elements 4, So, for example, the guide means may consist of a very low friction guide, and the dripping elements 4 may be shot into the pipe 5, for example by compressed air, or the guide means substantially have the form of tubes, and the dripping elements are shot through said tubes. The roller way 103 may be also replaced by a conveyor belt, a blade drive belt, particularly of such a type as to be elastically compliant when a predetermined dragging force is exceeded or by other means equivalent thereto or having the same function.

The means for dragging, advancing, or feeding the dripping elements 4 are driven in such a way that the speed of the dripping elements 4, upon impact with the pipe 5 is higher than that of the pipe 5. In this way, the impact kinetic energy causes the dripping element to penetrate at least partially in the surface of contact with the pipe 5, thus impressing a sort of mark.

As shown in the figures, the means for dragging, pushing or advancing the dripping elements 4 may continue their action on the dripping elements 4 even after the first impact with the pipe 5. In this case, since the speed of said advancing, dragging or pushing means is higher than that of the pipe 5, said means cause the dripping elements 4 to exert a certain compression action against the pipe 5, though avoiding to exert a braking action on the pipe 5.

The thrust exerted by driving the means for dragging, advancing or pushing the dripping elements 4 even after the contact of the latter with the pipe 5 has occurred, may be easily modulated or adjusted, by providing that the junction between said dragging, advancing or pushing means may be disengaged when the dripping element 4 reaches a certain resistance to advance. In this case, the rollers of the roller way 103 may be provided with a contact surface having a predetermined friction with respect to the bearing surface of the dripping elements 4, so that a friction effect of the dripping elements 4 on the rollers 103 is obtained. The dragging, advancing, and/or pushing means may be disengaged from the dripping elements 4, in the area situated downstream from the area of first contact with the pipe (5), when a predetermined pressure thereof against the pipe (5) is attained, due to the different advance speeds. Alternatively, as shown in FIG. 3, when a push-bar 10 is used, the latter may have a pushing head 110 which may be elastically retracted to a predetermined extent on the stem 210 and against the action of elastic means acting as an elastic damper 310, which are appropriately dimensioned as regards their force or elastic constant.

Figure 1:
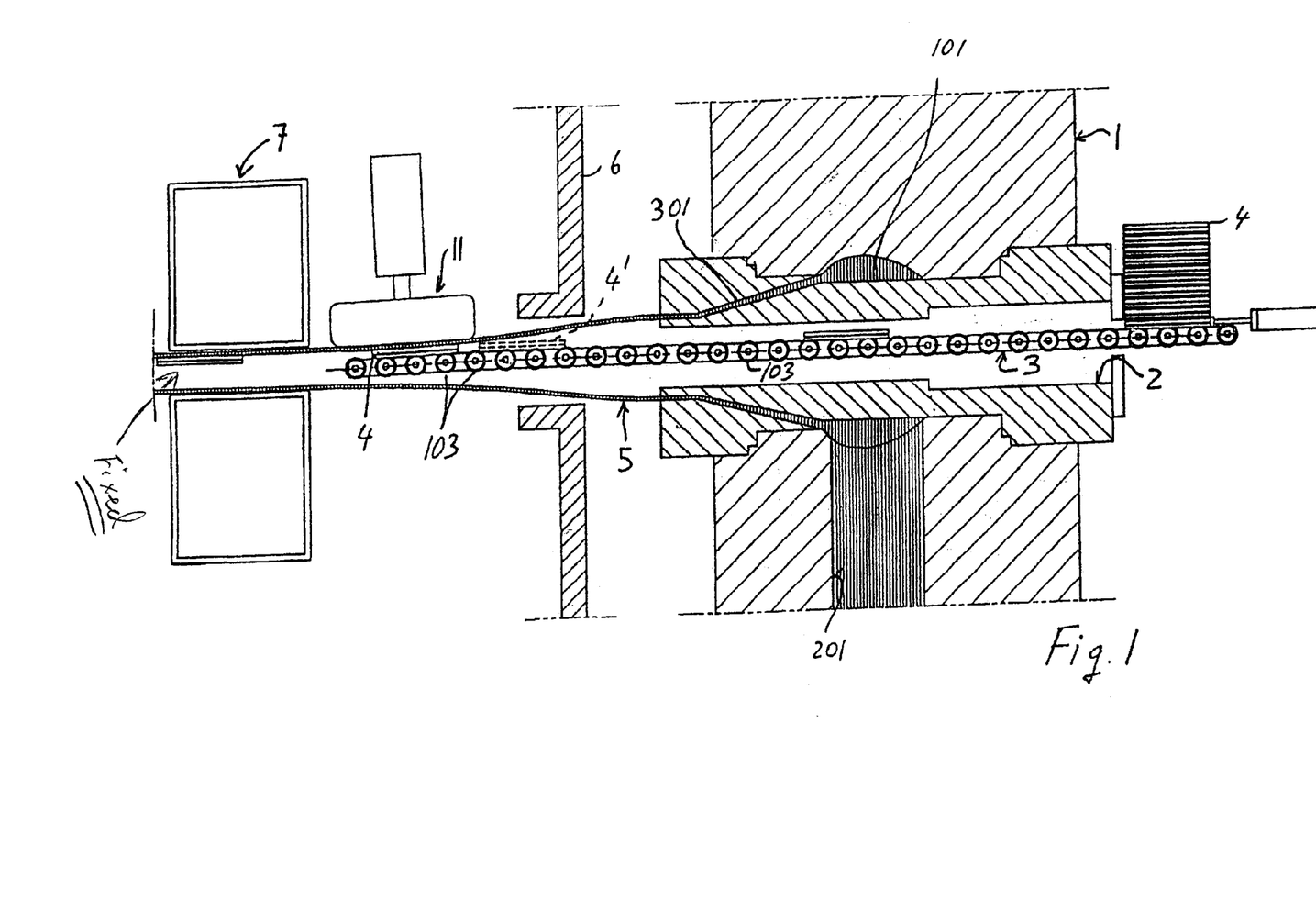
FIG. 1 is a schematic axial sectional view of a first example of a plant for implementing the method according to the invention, showing the relevant area of the plant.
Figure 2:
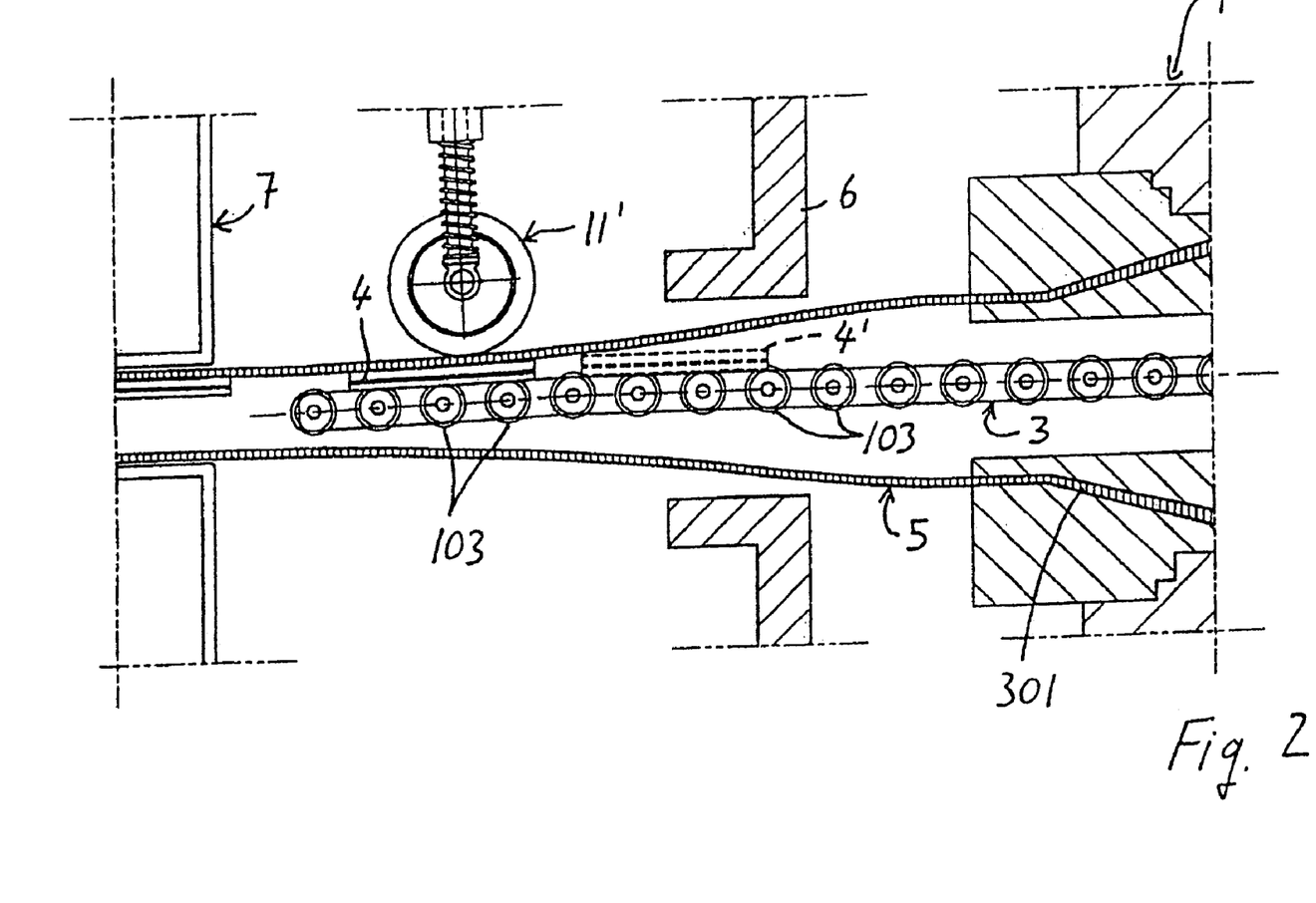
FIG. 2 is a view like that of FIG. 1, partly enlarged and showing a variant embodiment.
Figure 4:
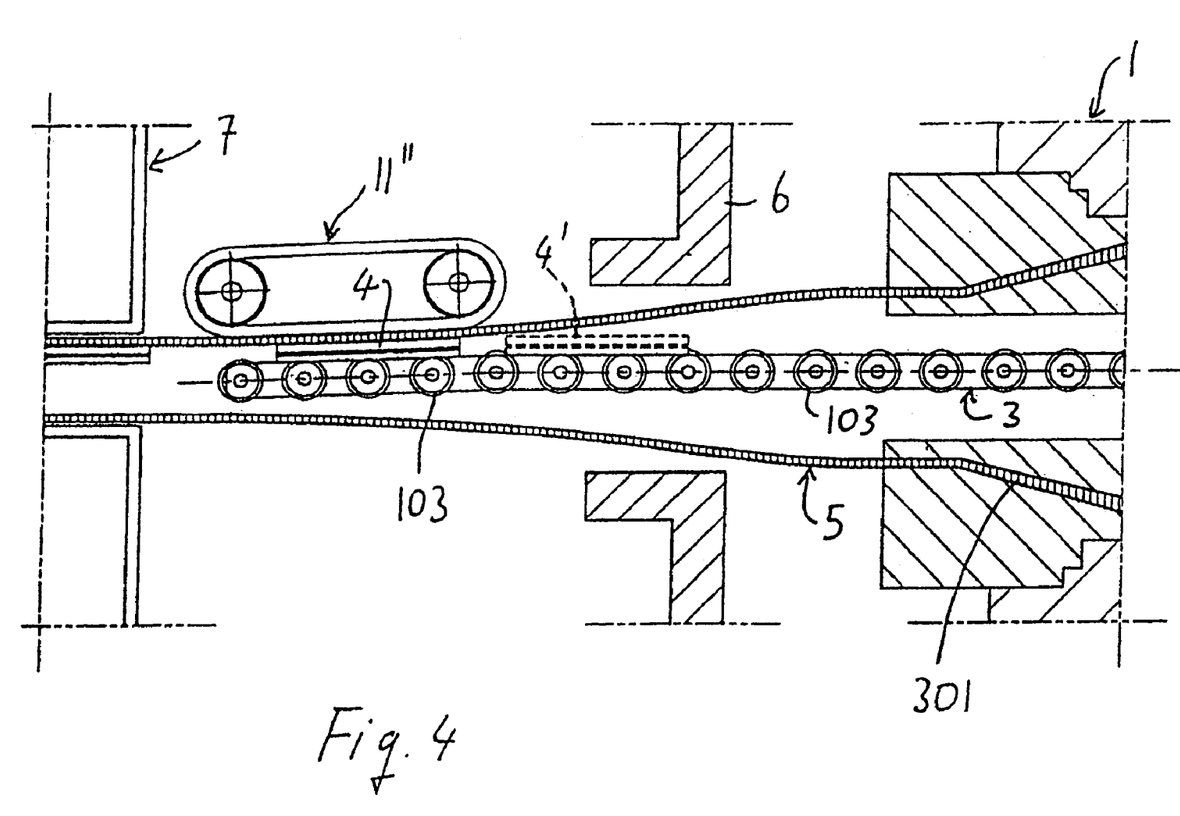
FIG. 4 is a view like those of the previous figures, showing a third embodiment.

The individual dripping elements may be advanced continuously, as shown in FIGS. 1, 2, 4. Naturally, in this case, in order to ensure that the dripping elements have the correct relative distance in the finished condition of the pipe, the dripping elements must have, on the feeding path, a greater distance from each other than the final distance separating them when they are fastened to the pipe, to an extent corresponding to the speed difference between the pipe and the dripping elements.

Figure 5:
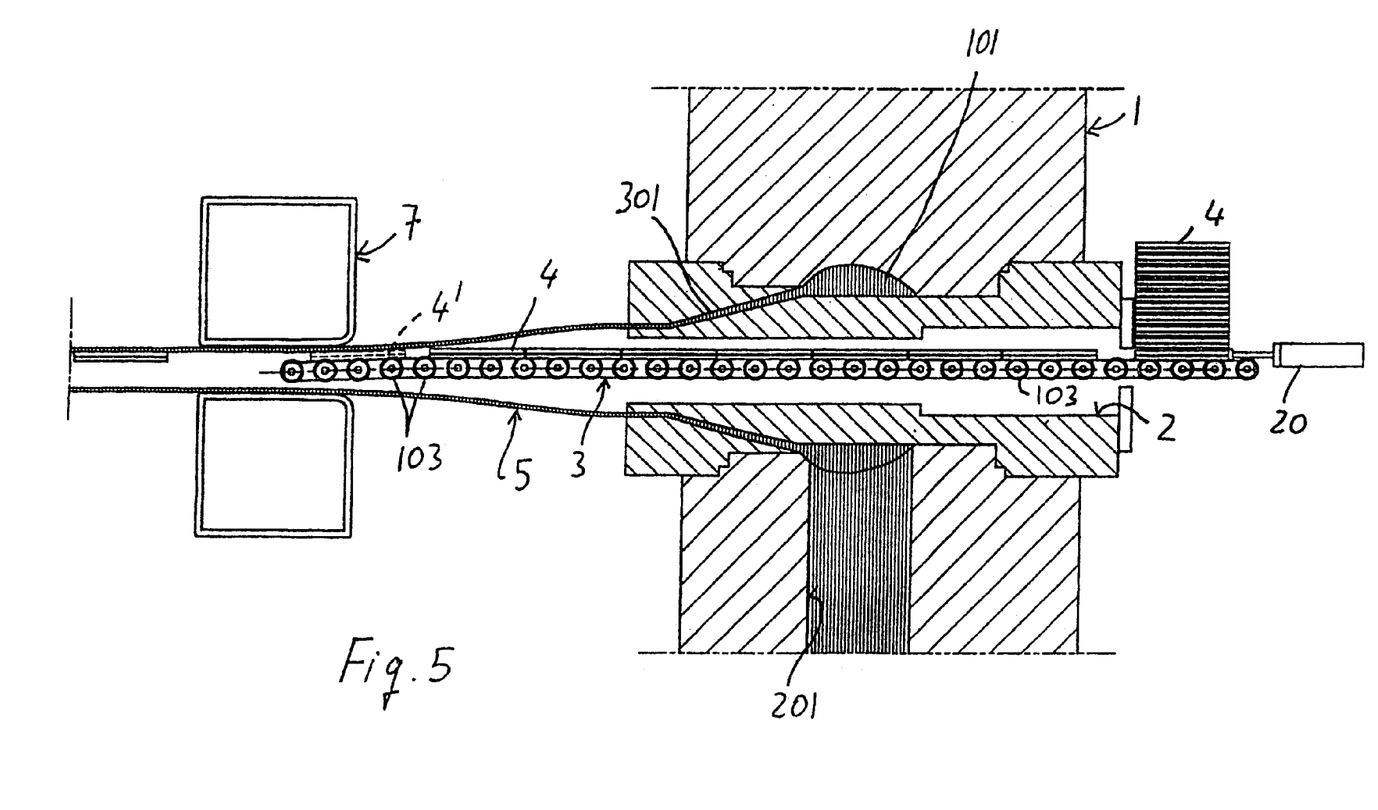
FIG. 5 is a view like that of FIG. 1, showing a variant embodiment, in which the compression means situated outside the pipe consist in the contact walls of a calibrator.

According to a further variant, shown in FIGS. 3 and 5, the dripping elements are fed in a stick-slip, i.e. reciprocating motion. In this case, the alternative feeding means may be provided like those shown in FIG. 3, i.e. acting separately on each individual dripping element, in accelerating it from a start station until the impact against the pipe occurs. Obviously, the push-bar of FIG. 3 is just an example of the possible different means for dragging, advancing, accelerating, and pushing the dripping elements.

FIG. 5 shows a further variant of the method for feeding the dripping elements. Here, the start station is provided in the area directly upstream from the area of contact between the pipe and the dripping element. On the path 3, whereon the dripping elements are fed into the pipe 5, there is provided a line of dripping elements all directly in contact with each other. Reciprocating pushing means 20 act on the first dripping element, the rearmost element of the line, with reference to the advance direction, and, all through the line, they accelerate at the predetermined impact speed the last forwardmost element of the line, which is in the aforesaid start station.

In FIGS. 1, 2, 3, 5, the numeral 4' indicates the dripping element in the condition of initial impact with the pipe 5, and said dripping element is outlined by a dashed line.

As is apparent from the figures, according to a further improvement of the invention, downstream from the contact area, and preferably in the area wherein the action of the means for dragging, advancing or pushing the dripping elements 4 is still operating, presser means 11 are provided outside the pipe 5, which compress with a predetermined force the pipe 5 against the corresponding dripping element 4, borne by the guide means 3 and/or by the dragging, advancing or pushing means.

In the embodiment as shown in FIG. 1, said means consist in a presser which is stationary with respect to the advance direction of the pipe, and is radially pushed against the pipe 5. The presser 11 is provided in the form of a pad made of a low friction material and its compression force may be adjusted, for example through adjustable elastic compression means, such as springs, or similar, or through pneumatic or hydraulic compression means, or the like.

Here, the additional thrust on the dripping elements 4 in this area compensates for any possible reduction in the advance speed of the pipe caused by che radial compression, which may involve a malformation of the pipe 5 itself.

Advantageously, the presser/s 11 may be also provided in such a way that they can passively accompany the pipe in its advance, as indicated by the wheel 11' in FIGS. 2 and 3 or by the belt or tape 11" in FIG. 4. Alternatively to the single wheel 11' and to the tape or belt 11", a train of rollers may be also provided.

A further improvement provides that the presser means 11, 11', 11", besides passively accompanying the pipe 5 in its advance, are driven by their own motion, at a predetermined speed, which substantially corresponds to the correct advance speed of the pipe at the location where said presser means 11, 11', 11" are provided.

By this arrangement, not only is the pipe prevented from slowing down but, thanks to the combined action of the presser means 11, 11', 11" and of the dragging, advancing and pushing means, the advance speed of the pipe may be adjusted accurately, allowing to compensate for any other speed deviations caused by other reasons.

With reference to the figures and particularly with reference to FIG. 3, according to a further improvement, the guide means 3, in the internal end region of the pipe 5, i.e. in the area corresponding to the possible external presser means 11, 11', 11" have such an orientation that the contact surface of the dripping elements 4 is parallel to the corresponding inner contact surface of the conical wall of the pipe 5. Moreover, the presser means 11, 11', 11" are also oriented accordingly and are loaded perpendicularly to said conical length of the pipe 5.

With reference to the variant embodiment of FIG. 5, the presence of external presser means may be avoided, by using to this end the succeeding calibrator 7. In this case, after a conical free length of the pipe 5, wherein the pipe and the dripping elements get in contact, the latter moving at a higher speed than the pipe, the pipe 5 enters the calibrator, which has an aperture, while the guide 3 extends therein.

The wall of the aperture for letting the pipe 5 into the calibrator 7 acts in this case as a presser element.

Also in this further example, such a wall may be stationary, or may have, in the area of contact with the pipe length wherein the dripping element is provided, contact surfaces which may be moved either passively, i.e. being idle, or actively, i.e. being motor-driven, such as a wheel, a roller, or similar.

Naturally the invention is not limited to what has been described and illustrated herein, but may be greatly varied, especially as regards construction, without departure from the guiding principle disclosed above and claimed below.

I claim:

1. A method for fabricating drip irrigation pipes comprising the following steps:
    a) Extruding a plastic pipe (5) through an extruding head (1);
    b) Progressively reducing the pipe (5), from the diameter coming out of the extruding head to a final diameter, during which reduction the extruded pipe (5) has a conical length;
    c) Inserting a plurality of dripping elements (4) consecutively and keeping pace with the advance of the extruded pipe, through the extruding head (1) and into the extruded pipe (5);
    d) Advancing, dragging and/or pushing each dripping element (4) to an area of the pipe (5), whereat each dripping element (4) is brought to contact with a predetermined area of the inner surface of the pipe (5), while having a predetermined speed relative to the speed of the pipe when contact occurs;
    e) Cooling the pipe (5) with the dripping elements;
    f) Perforating the pipe (5) where the dripping elements (4) are provided;
    Characterized in that
    g) At least before the contact between the pipe (5) and each dripping element (4) occurs, the dripping element (4) has a higher speed than the pipe (5); and
    h) the speed of the dripping elements (4) is higher than that of the pipe (5), at least immediately before the contact with the pipe (5) occurs and until the dripping element (4) hits the wall of the pipe (5);
    the advancing, dragging and/or pushing force after the dripping elements (4) contact the pipe (5) is same as the dragging, advancing and/or pushing force before the dripping elements contact the pipe (5).

2. A method as claimed in claim 1, characterized in that the mutual orientation of the inner surface of the pipe (5) and of the facing contact surface of the dripping elements (4) in the area or moment of contact vary a transverse component of the force directed radially towards the pipe (5) when the dripping elements (4) hit the pipe (5).

3. A method as claimed in claim 1, characterized in that the higher speed of the dripping elements (4) when they hit the inner surface of the pipe (5) is such as to generate an impact mark in the inner surface of the pipe (5), which is a wedging mark.

4. A method as claimed in claim 1, characterized in that the contact between the dripping elements and the inner surface of the pipe occurs in the conical narrowed length of the pipe, the path of the dripping elements (4) converging at least on one side towards the conical wall of the pipe (5).

5. A method as claimed in claim 1, characterized in that after the first contact between the dripping elements (4) and the pipe (5) has occurred, a path length is provided, and compression means for exerting a mutual compression force on the dripping elements (4) and on the pipe (5).

6. A method as claimed in claim 5, characterized in that the compression force is exerted while continuing to advance, drag and/or push the dripping elements (4) with the same force or at the same conditions as those provided before contact with the pipe (5).

7. A method as claimed in claim 1, characterized in that a pressure on the pipe (5) against the dripping elements (4) downstream from the first contact area acts as an external pressure on the pipe (5), and wherein the dripping elements are supported by abutment means (3).

8. A method as claimed in claim 7, characterized in that the external pressure is exerted by stationary means, the stationary means at least having surfaces of contact with the pipe (5) which are stationary with respect to the advance motion of the pipe (5), and said means being adjustable with respect to their pressure force.

9. A method as claimed in claim 7, characterized in that the external pressure is exerted by means which passively accompany the advance motion of the pipe (5), the means having contact surfaces which may be moved according to the advance of the pipe (5).

10. A method as claim in claim 7, characterized in that the external pressure is exerted by means which are driven by their own motion in a direction corresponding to the advance direction of the pipe (5), the means having at least one surface of contact with the pipe (5) which is driven so that it may be moved in the advance direction of the pipe (5), and exerting at the same time a dragging action on the pipe (5).

11. A method as claimed in claim 7, characterized in that the external pressure is exerted substantially perpendicularly to the surface of the pipe (5) and/or of the dripping elements (4).

12. A method as claimed in claim 1, characterized in that the dripping elements (4) are supported by stationary slide abutments in a compression area having slide abutment surfaces which are stationary with respect to the advance motion thereof.

13. A method as claimed in claim 1, characterized in that the dripping elements (4) are supported by abutments which passively accompany the advance motion of the dripping elements (4) with the pipe (5).

14. A method as claimed in claim 1, characterized in that the dripping elements (4) are supported by abutments which actively accompany the advance motion of the dripping elements (4) with the pipe (5), being themselves driven by their own motion in the same direction as the advance direction of the dripping elements (4) with the pipe.

15. A method as claimed in claim 7, characterized in that the driving speed of the external pressure means and/or of the internal abutments for the dripping elements (4) in the same direction as the advance direction of the pipe (5) is adjustable.

16. A method as claimed in claim 1, characterized in that the orientation of the dripping elements (4) and of the pipe (5) in a compression length is such that the two parts are parallel at least by their contact surfaces.

17. A method as claimed in claim 1, characterized in that the initial contact area between the dripping elements (4) and the pipe (5) along a compression length are provided in the conical narrowed length of the pipe.

18. A method as claimed in claim 1, characterized in that the dripping elements (4) are advanced on a feed path (3) continuously and consecutively, the distance between the individual dripping elements (4) on the feed path (3) being greater than the distance between said dripping elements (4)

when they are applied to the pipe, to an extent related to the difference between the speeds of the extruded pipe (5) and of the dripping elements (4).

19. A method as claimed in claim 1, characterized in that the dripping elements are advanced in a reciprocating stick-slip motion, there being provided a start station wherein each dripping element is kept still or anyway moved at a speed which is lower than or equal to that of the pipe and wherefrom said dripping element (4) is accelerated in the direction of the area of contact with the pipe (5) separately and directly or by successive dripping elements (4), arranged in a line in mutual contact, the acceleration action being exerted on the first dripping element (4) of the line at the rear end thereof with reference to the advance direction of the dripping elements (4).

20. A plant for fabricating drip irrigation pipes characterized in that said plant comprises:
   a) Means (1) for extruding a plastic pipe (5), through an extruding head;
   b) Calibrating means (6, 7) for progressively reducing the pipe (5) from the diameter coming out of the extruding head (1) to a final diameter along which reduction, the extruded pipe has a conical length;
   c) Feeding means (3) for inserting consecutively a plurality of dripping elements (4), and keeping pace with the advance of the extruded pipe (5), through the extruding head (1) and into the extruded pipe (5);
   d) Advancing and/or pushing and/or dragging means (103, 11) for feeding each dripping element (4) to the area of the pipe whereat each dripping element (4) is brought to contact with a predetermined area of the inner surface of the pipe (5), while having a predetermined speed with respect to the speed of the pipe (5) when contact occurs;
   e) Means for perforating the pipe where the dripping elements are provided; and
   f) Wherein said speed of the dripping elements when feeding the dripping elements into the pipe is higher than the speed of the pipe (5) at least when contact between the pipe and each dripping element occurs;
   wherein the dragging, advancing and/or pushing means are driven in the area situated downstream from the area of first contact between the dripping elements (4) and the pipe (5), same as in the area situated upstream from the area of first contact between the dripping elements (4) and the pipe (5), such that the dripping elements (4) are given a speed which is higher than that of the pipe (5), disengaging said dragging, advancing and/or pushing means from their respective dripping elements (4), in the area situated downstream from the area of first contact with the pipe (5).

21. A plant as claimed in claim 20, characterized in 15 that the means for advancing, dragging and/or pushing the dripping elements (4) are driven in such a way as to cause an impact of the dripping elements against the pipe which is meant to impress a mark in the contact area of the inner surface of the pipe (5).

22. A plant as claimed in claim 20, characterized in that the advancing and/or pushing and/or dragging means further comprises means (3) for guiding the dripping elements (4), consisting of a stationary slide surface.

23. A plant as claimed in claim 22, characterized in that the means (3, 103) for guiding the dripping elements (4) comprises surfaces which are passively moved together with said dripping elements (4) or of rolling surfaces.

24. A plant as claimed in claim 23, characterized in that the guide means (3, 10) act, at the same time, as means for dragging, advancing and/or pushing the dripping elements (4), being provided with surfaces for bearing the dripping elements (4), which are driven by a motion having the same direction as the advance direction of said dripping elements (4) inside the pipe (5).

25. A plant as claimed in claim 23, characterized in that the dragging, advancing and/or pushing means exert their action for a predetermined length even after the first contact between the dripping elements (4) and the pipe (5) has occurred, the means for guiding them (3, 103) extending also beyond the area of first contact with the pipe (5).

26. A plant as claimed in claim 20, characterized in that, in the area situated downstream from the first contact between the dripping elements (4) and the pipe (5) there are provided presser means (11, 11', 11"), outside the pipe (5), which are stressed by an adjustable compression force having at least one component perpendicular to the wall of the pipe (5).

27. A plant as claimed in claim 26, characterized in that the presser means consist of a stationary presser means (11), i.e. a means at least having surfaces of contact with the pipe (5) which are stationary with respect to the advance motion of the pipe (5).

28. A plant as claimed in claim 26, characterized in that the presser means have a contact surface which passively accompanies the advance motion of the pipe (5), or a surface which is meant to roll thereon.

29. A plant as claimed in claim 26, characterized in that the presser means have one surface of contact with the pipe (5) which is driven by its own motion in the advance direction of the pipe (5), and which exerts a pushing and/or dragging action on the pipe (5) in the advance direction.

30. A plant as claimed in claim 20, characterized in that at least in the area of first contact between the dripping elements (4) and the inner surface of the pipe (5), the profile of the pipe (5) and the path of the dripping elements converge.

31. A plant as claimed in claim 20, characterized in that in the area wherein the dripping elements (4) are compressed against the pipe (5), downstream from the area of first contact between said two parts, the profile of the pipe (5), i.e. of its wall, and the path of the dripping elements (4) are parallel or slightly convergent.

32. A plant as claimed in claim 20, characterized in that the first contact area is provided downstream from a first wall having the function to narrow the pipe (5) from the diameter coming out of the extruder to a first smaller diameter, and upstream from a succeeding intermediate or final calibrator for further narrowing the pipe (5) to a further intermediate smaller diameter or to the final smaller diameter.

33. A plant as claimed in claim 32, characterized in that the first contact area and/or the area wherein the dripping elements (4) with the pipe (5) are compressed are provided in the same conical length of the pipe (5).

34. A plant as claimed in claim 20, characterized in that the means for advancing, dragging or pushing the dripping elements (4) are of the continuous or reciprocating type.

* * * * *